United States Patent [19]
Baradel et al.

[11] Patent Number: 4,701,311
[45] Date of Patent: Oct. 20, 1987

[54] PROCESS FOR SEPARATING ARSENIC FROM ACID SOLUTIONS CONTAINING IT

[75] Inventors: Agostino Baradel, Milan; Renato Guerriero, Mestre; Giuseppe Veronese, Padua, all of Italy

[73] Assignee: Consiglio Nazionale Delle Richerche, Rome, Italy

[21] Appl. No.: 791,105

[22] Filed: Oct. 24, 1985

[30] Foreign Application Priority Data

Oct. 25, 1984 [IT] Italy ............................... 84141 A/84

[51] Int. Cl.$^4$ ............................................. C01B 27/00
[52] U.S. Cl. .............................. 423/87; 204/DIG. 13; 423/24
[58] Field of Search .................................. 423/87, 24; 204/DIG. 13

[56] References Cited
PUBLICATIONS

Chemical Abstracts Citation 91: 182190w.
Chemical Abstracts Citation 88: 163268z.
Kratzer et al, "The Extraction of Arsenic/V/Complex with Pyrogallol," *Radiochem. Radioanal. Letters* 40/1/61–68 (1979).

*Primary Examiner*—John Doll
*Assistant Examiner*—Wayne A. Langel
*Attorney, Agent, or Firm*—Charles W. Fallow; Martin P. Hoffman; Mitchell B. Wasson

[57] ABSTRACT

A process for the selective extraction of arsenic from acid solutions containing other metals comprising treating the solutions with polyhydroxybenzene derivatives in organic diluent; mono- and di- alkyl derivatives containing at least four alkyl carbon atoms of pyrocatechol and pyrogallic acid are particularly contemplated for use in the removal of arsenic from strongly acid copper-containing electrolyte solutions.

26 Claims, No Drawings

PROCESS FOR SEPARATING ARSENIC FROM ACID SOLUTIONS CONTAINING IT

BACKGROUND OF THE INVENTION

1. Field of the Invention

The present invention relates to a process for separating arsenic from acid solutions. More particularly, the invention relates to a process for separating arsenic from sulfuric solutions of copper and other ions.

Almost all commercial copper is produced by electrolytic refining of a raw material comprising 99.5% copper and further containing arsenic; many other impurities are also present. The raw material (also known as "blister") is suitably smelted and recast into plates to form the anode of an electrolytic cell for the refining process; the cathode is typically a copper plate or, in the most modern plants, a stainless steel or titanium plate. The electrolyte is usually a solution of cypric sulfate, containing much free sulfuric acid.

When electric current is applied during refining, copper dissolves from the anode and deposits at the cathode. Some of the impurities of the anode are insoluble and form the so-called "anode mud", while other impurities (elements less noble than copper) also dissolve electrolytically. One of these latter impurities is arsenic, which thus builds up in the electrolyte, from which it must be removed in order to avoid copper contamination at the cathode.

There are also other metallurgical processes in which the control and the removal of arsenic are very important. For instance, similar problems exist in the case of the recovery of copper by electrolysis with insoluble anodes from residuals, i.e., the copper scums coming from purification stages in the primary metallurgy of lead.

In all cases, the input-output equilibrium of arsenic (and of the other impurities) must be controlled. A well-known technique is to bleed part of the copper electrolyte which is then sent to multi-stage electrowinning cells in which arsenic is eliminated as a copper-arsenic alloy; however, the electrolysis of a solution poor in copper and rich in arsenic causes the hazard of generation of arsine, a very toxic gas, which therefore requires particular facilities and precautions. Furthermore, the recycling of the product alloy sometimes presents technical and economic problems.

Therefore, it is particularly interesting to have an easier process for the selective removal of arsenic from the copper electrolyte or from strongly acid solutions, and solution extraction has been proposed.

2. Discussion of Related Art

Methods wherein arsenic is extracted from copper electrolyte with suitable organic solutions such as solutions containing tributylphosphate as the main active component are known. From such solutions arsenic is extracted with water or acid or alkaline aqueous solutions, and separated by precipitation as the corresponding sulfide, using hydrogen sulfide or alkaline sulfides, or as arsenic trioxide, using sulfur dioxide or sulfites.

DE-OS No. 2.603.874 discloses the separation of arsenic from copper in sulfuric acid solutions by extraction with hydrocarbon solutions containing 50–75% of tributylphosphate and 5% or less of a high-boiling alcohol, the function of which is stated to prevent the formation of a third phase when the concentration of arsenic in the organic phase increases.

DE-OS No. 2.615.638 discloses the similar use of a trialkylic, triarylic or triarylalkylic phosphate, preferably tributylphosphate, diluted with a hydrocarbon and containing smaller quantities of isodecyl alcohol, which has the function of emulsion inhibitor.

GB-PS No. 1.551.023 discloses the comparable use of a hydrocarbon solution containing 40–75% of tributylphosphate and up to 15% of a quaternary ammonium salt, preferably methyltricaprylammonium chloride or a mixture of methyltri($C_8$–$C_{10}$)alkylammonium chlorides.

In all the three cited specifications, tributylphosphate, a quite toxic substance, is used in considerable quantities; furthermore in GB-PS No. 1.551.023, the addition of a quaternary ammonium salt causes a further increase in toxicity in the extracting organic mixture. Furthermore, in these specifications, the affinity of the extractant for arsenic is moderate, and, as a result, many extraction stages with a high ratio of organic/water are required.

Similarly, the capability of polyphenols having two hydroxyls in vicinal positions to form chelate complexes with arsenious acid in strong mineral-acid solutions is well-known. Such complexes with pyrocatechol and with pyrogallic acid, formed by the reaction of a molecule of arsenic or arsenious acid respectively with three or two molecules of the polyphenol, were carefully examined.

SU-PS No. 765.402 discloses the separation of arsenic from acid solutions using a resin comprising the polycondensation product of pyrocatechol and formaldehyde. However, such resins typically have a poor affinity for arsenic due to the necessity of arranging two or even three phenolic groups to allow bonding with the arsenic according to the geometric configuration that the complex must assume; such a possibility is prevented by the three-dimensional structure of the resin and thus the affinity of the resin for arsenic is reduced by one order of magnitude. This condition is common for all cases in which, to bind the metal, more than one chelating molecule is necessary. Thus, as a practical alternative, the liquid/liquid extraction remains, in which organic chelating agents, which are practically water-insoluble are used as extraction agents.

SUMMARY OF THE INVENTION

The invention accordingly provides a method for separating arsenic from copper electrolyte or, in general, from acid solutions containing other metal ions, by a simple and easy way, with high efficiency and without using substances having high toxicity. According to the method of the invention, an acid arsenical solution is treated with an organic extractant of arsenic, and the resulting organic arsenical solution is treated with a countersolvent, thereby stripping the arsenic from this solution. As extractant, the method employs an organic solution of a compound having the general formula $$C_6R_n(OH)_mH_{6-(m+n)}$$

in which
  $C_6$ is the group of six atoms of carbon forming an aromatic nucleus;
  R is an alkyl, alkenyl, cycloalkenyl, cycloalkyl, or arylalkyl radical;
  OH is a phenolic hydroxyl
  n is a whole number from 1 to 4; and
  m is a whole number from 2 to 4.

In order to get a quite low solubility in water and a good solubility in hydrocarbons, the radical or radicals R bonded to the benzene nucleus contain, altogether, at least four atoms of carbon, and preferably more than five. Similarly, in order to get a low solubility in water and a good solubility in hydrocarbons, m is not greater than 3, and is preferably equal to 2.

Among the compounds that are useful in the process according to the invention, the mono- and di-alkyl derivatives of the following compounds are preferred: (1,2)-dihydroxybenzene (pyrocatechol); (1,2,3)-trihydroxybenzene (pyrogallic acid); (1,2,4)-trihydroxybenzene (hydroxyhydroquinone); (1,2,3,4)-tetrahydroxybenzene; (1,2,3,5)-tetrahydroxybenzene; (1,2,4,5)-tetrahydroxybenzene.

Particularly suitable are the mono- and di-alkyl derivatives of pyrocatechol and pyrogallic acid, e.g., hexylpyrocatechol, dihexylpyrocatechol, octylpyrocatechol, dioctylpyrocatechol, dodecylpyrocatechol, pentadecylpyrocatechol, octadecylpyrocatechol, nonylpyrogallic acid, dodecylpyrogallic acid, and hexadecylpyrogallic acid.

All these compounds are easily and cheaply obtained by a reaction between a polyphenol and an olefin in presence of an acid catalyst according to well-known technology such as that used, for example, to obtain mono- or di-tert-butyl derivatives of phenol and of pyrocatechol of the type universally used as antioxidants.

The compounds employed in the present invention are very viscous solids or liquids, and therefore must be used in solutions of suitable organic diluents. The diluents useful for this purpose include aliphatic, cycloaliphatic, aromatic hydrocarbons, and/or aliphatic, cycloaliphatic, and arylaliphatic alcohols. Such diluents also comprise mixtures of these compounds in various proportions and compositions, as well known to these skilled in the art.

The concentration of the active compound in the organic phase is variable over a very wide range and is limited only by its solubility in the selected diluent at the operating temperature; preferably, the concentration varies from 0.1-molar to 1-molar. The ratio between the organic phase and the aqueous phase varies from 0.02 to 10; preferably from 0.1 to 4.

The stripping of arsenic from the organic phase with the countersolvent is made without difficulty by using alkaline solutions, for example, sodium hydroxide solutions from 0.1N to 6N, preferably from 1N to 3N.

The following examples will further clarify the invention.

EXAMPLE 1

100 ml of an aqueous solution containing sulfuric acid (200 g/l), copper (45 g/l) and arsenic (5.9 g/l) were poured into a 250 ml separatory funnel. Then a 0.3M solution of n-hexylpyrocatechol (100 ml), (a mixture of the two position isomers obtained from the reaction of 1-hexene with excess of pyrocatechol), was added into ESCAID 100; the mixture was strongly stirred for 10' and made then to settle for 30'.

After the separation of the phases, the aqueous phase contained 0.71 g/l of arsenic (extraction of 88%).

EXAMPLE 2

In the same way as the previous example, 100 ml of a copper solution was contacted with a 0.3M solution of dioctylpyrocatechol (100 ml) in ESCAID 100, obtained from the reaction of an excess of 1-octene with pyrocatechol.

After the separation of the phases, the aqueous phase contained 0.54 g/l of arsenic (extraction of 91%).

This example illustrates that the increase in the molecular weight of the active compound, which gives it a lower solubility in water, does not compromise the extraction yield.

EXAMPLE 3

The procedure of Example 2 was followed, except that five extractions were made, interrupting agitation at different times.

The results, listed in the following Table I, show the rapidity of extraction and the stabilization of the product, requiring two minutes only.

TABLE I

| Time (minutes) | 1 | 2 | 5 | 10 | 15 |
|---|---|---|---|---|---|
| Extraction (1%) | 86.4 | 91.2 | 91.0 | 91.0 | 90.9 |

EXAMPLE 4

The procedure of Example 2 was followed, wherein five extractions were made in which the volumetric ratio between organic phase and aqueous phase (O/A) was varied.

The results, listed in the following Table II, show that even with a low organic/aqueous phase ratio it is possible to obtain a high percentage of arsenic extraction, making it unnecessary to use high quantities of organic solvent.

TABLE II

| O/A | 0.5 | 0.75 | 1.0 | 1.5 | 2.0 | 3.0 |
|---|---|---|---|---|---|---|
| Extraction % | 76.8 | 88.8 | 91.0 | 94.6 | 95.8 | 96.1 |

EXAMPLE 5

25 ml of the organic solution used in Example 2 ml of the organic solution used in Example 2 (containing 5.36 g/l of arsenic) and 25 ml of aqueous solution of 2N sodium hydroxide were poured into a 100 ml separatory funnel. The two phases were strongly stirred for 10' and then made to settle.

After separation of the phases, in the aqueous phase there were 5.0 g/l of arsenic (93%). This shows the effectiveness of stripping arsenic from the organic phase.

We claim:

1. A process for separating arsenic ions from an acid aqueous solution consisting essentially of:
   (a) treating the acid solution with an organic extractant in an organic diluent to obtain an organic phase comprising extractant diluent, and arsenic, and an aqueous phase; and
   (b) treating the organic phase with a countersolvent to strip the arsenic therefrom; characterized in that the extractant is a compound of the formula (1):

$$C_6R_n(OH)_mH_{6-(m+n)} \qquad (1)$$

in which
$C_6$ is an aromatic nucleus;
R is an alkyl; alkenyl; cycloalkyl; or arylalkyl radical substituting the aromatic nucleus;
OH is hydroxyl substituting the aromatic nucleus;
n is a whole number from 1 to 4; and m is a whole number from 2 to 4.

2. The process of claim 1 characterized in that the radical or radicals R, contain, altogether, at least four carbon atoms.

3. The process of claim 1, wherein the compound of the formula (1) is a mono- or di-alkyl derivative of one of the following compounds:
(1,2)-dihydroxybenzene (pyrocatechol;
(1,2,3)-trihydroxybenzene (pyrogallic acid);
(1,2,4)-trihydroxybenzene (hydroxyhydroquinone);
(1,2,3,4)-tetrahydroxybenzene;
(1,2,3,5)-tetrahydroxybenzene; or
(1,2,4,5)-tetrahydroxybenzene.

4. The process of claim 3, wherein the compound is selected from the group consisting of hexylpyrocatechol; dihexylpyrocatechol; octylpyrocatechol; dioctylpyrocatechol; dodecylpyrocatechol; pentadecylpyrocatechol; octadecylpyrocatechol; nonylpyrogallic acid; dodecylpyrogallic acid; and hexadecyl pyrogallic acid.

5. The process of claim 2, wherein the radical or radicals R contain more than five carbon atoms.

6. The process of claim 1, wherein m is less than four.

7. The process of claim 6, wherein m is two.

8. The process of claim 3, wherein the compound of the formula (1) is a mono- or di-alkyl derivative of pyrocatechol or pyrogallic acid.

9. The process of claim 1, wherein the acid solution is treated with the organic extractant in a hydrocarbon diluent.

10. The process of claim 1, wherein the organic diluent is an aliphatic, cycloaliphatic, or aromatic hydrocarbon; or an aliphatic, cycloaliphatic, or arylaliphatic alcohol; or a mixture thereof.

11. The process of claim 1, wherein the countersolvent is an alkaline aqueous solution.

12. The process of claim 11, wherein the alkaline aqueous solution is a 0.1N to 6N solution of sodium hydroxide.

13. The process of claim 12, wherein the solution of sodium hydroxide is from 1N to 3N.

14. The process of claim 1, wherein the concentration of extractant in the organic phase is from 0.1M to 1M.

15. The process of claim 1, wherein the volume ratio between the organic phase and aqueous phase is from 0.1 to 4.

16. The process of claim 1, wherein the acid solution contains at least one metal ion in addition to the arsenic ion.

17. The process of claim 1, wherein the acid solution contains copper ions in addition to arsenic ions.

18. A process for the selective removal of arsenic from copper-containing acid aqueous solutions thereof consisting essentially of
(a) treating the acid aqueous solution with an extractant in an organic diluent, said extractant having a low solubility in water and a good solubility in the diluent and being a compound of the formula (1)

$$C_6R_n(OH)_mH_{6-(m+n)} \qquad (1)$$

wherein
$C_6$ is an aromatic nucleus;
R is an alkyl, alkenyl, cycloalkyl, cycloalkenyl, or aralkyl radical substituting the aromatic nucleus;
OH is hydroxy substituting the aromtic nucleus;
n is 1 to 4;
m is 2 to 4; and
the radical or radicals R contain altogether at least four carbon atoms to form an aqueous phase and an organic phase comprising extractant, arsenic, and diluent; and
(b) treating the organic phase with a countersolvent for the arsenic to strip the arsenic therefrom.

19. The process of claim 18, wherein the countersolvent is an aqueous alkaline solution.

20. The process of claim 18, wherein the compound of formula (1) is a mono- or di-alkyl derivative of pyrocatechol; pyrogallic acid; hydroxyhydroquinone; or 1,2,3,4-, 1,2,3,5-, or 1,2,4,5-tetrahydroxybenzene.

21. The process of claim 20, wherein the compound is a mono- or di-alkyl derivative of pyrocatechol or pyrogallic acid.

22. The process of claim 18, wherein the volume ratio between the organic phase and aqueous phase is from 0.1 to 4.

23. The process of claim 18, wherein the radical or radicals R contain more than five carbon atoms.

24. The process of claim 21, wherein m is 2 to 3.

25. The process of claim 18, wherein m is 2.

26. The process of claim 18, wherein the diluent is a hydrocarbon or alcohol.

* * * * *